United States Patent [19]

Schlanzky

[11] 3,910,464

[45] Oct. 7, 1975

[54] IN-TANK FUEL PUMP SUPPORT UNIT AND ASSEMBLY

[75] Inventor: Manfred P. H. Schlanzky, Frankenmuth, Mich.

[73] Assignee: General Motors Corporation, Detroit, Mich.

[22] Filed: Aug. 1, 1974

[21] Appl. No.: 493,497

[52] U.S. Cl. .............. 222/180; 222/333; 222/385; 137/565
[51] Int. Cl.² .......................................... A01C 15/00
[58] Field of Search .......... 123/136, 139 E, 32 AC; 222/180, 333, 385; 137/565, 588, 590

[56] References Cited
UNITED STATES PATENTS

| | | | |
|---|---|---|---|
| 2,984,106 | 5/1961 | Kamm | 222/385 |
| 3,014,623 | 12/1961 | Horn et al. | 222/333 |
| 3,039,658 | 6/1962 | Hoelle | 222/180 |
| 3,369,715 | 2/1968 | Carter | 222/385 |
| 3,418,991 | 12/1968 | Shultz et al. | 123/179 |
| 3,696,975 | 10/1972 | Bryant et al. | 222/333 |

Primary Examiner—Charles J. Myhre
Assistant Examiner—James D. Liles
Attorney, Agent, or Firm—Robert M. Sigler

[57] ABSTRACT

A fuel pump assembly for use with a fuel tank having an access opening in the top includes a fuel pump support unit comprising an access opening cover, a rigid conduit projecting through the cover and a bracket including a plurality of arms attached to the rigid conduit and supporting a generally horizontal circular seat below the lower end of the rigid conduit. An axial flow fuel pump with a cylindrical body, an annular flange and inlet and outlet openings at opposite axial ends is supported in the seat by an annular resilient member with the inlet near the bottom of the tank and the outlet near the lower end of the rigid conduit. The annular flange prevents the pump from falling through the seat but allows the pump to be pushed upward out of the seat when subjected to forces from below. A resilient conduit normally connects the pump outlet with the lower end of the rigid conduit; and a gauge sender and float unit may be attached to one of the bracket arms. The access opening cover may further include a vapor outlet.

5 Claims, 4 Drawing Figures

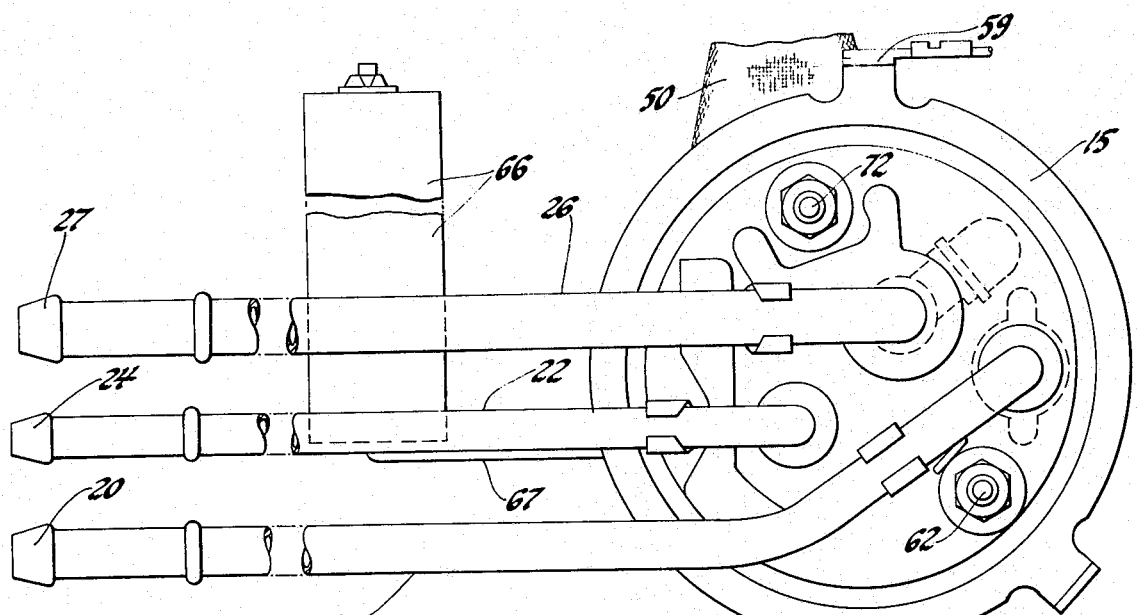
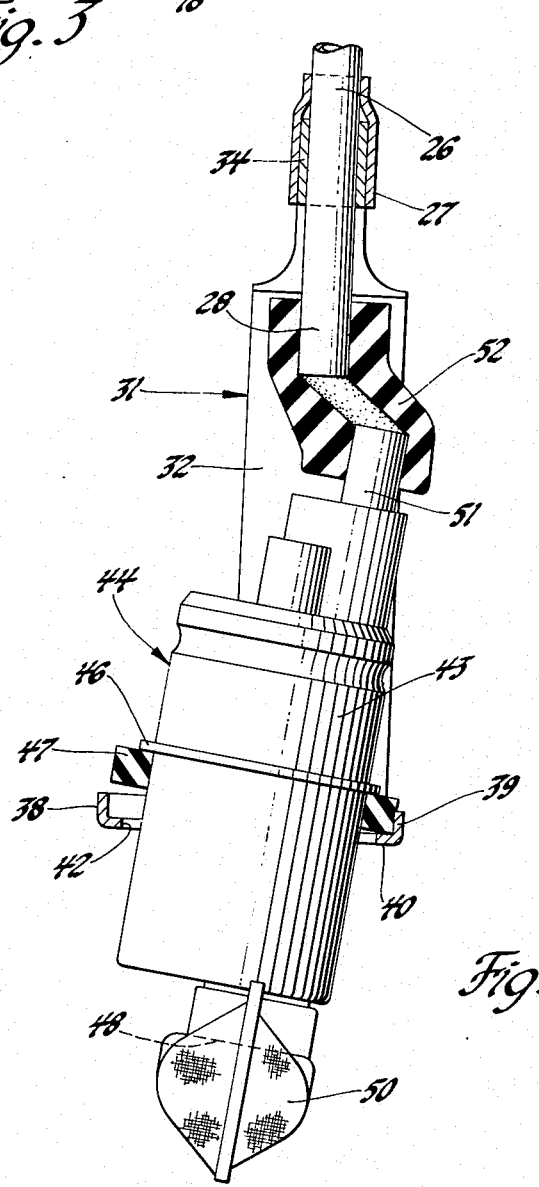
Fig. 3
Fig. 4

IN-TANK FUEL PUMP SUPPORT UNIT AND ASSEMBLY

BACKGROUND OF THE INVENTION

My invention relates to an improved apparatus for locating and supporting an electric fuel pump within a fuel tank. A typical in-tank electric fuel pump assembly includes a fuel pump supported near the bottom of the fuel tank and an outlet conduit projecting through the top of the tank. The assembly is usually arranged in such a way that the inlet of the fuel pump will be in approximately the geometric center of the bottom of the tank, since that point is the place where fuel is most likely to be found when the tank is nearly empty and the fuel moves in different directions due to vehicle accelerations and slopes in the road.

Most vehicle fuel tanks include a vapor outlet in the top center of the tank as a part of the emission control system. The vapor outlet is located at the center of the tank because this is the location at which liquid fuel is the least likely to be thrown up into the vapor outlet as the vehicle accelerates or moves up and down hill. The fact that the optimal location of the vapor outlet is immediately above the optimal location of the fuel pump inlet makes it convenient for the vapor outlet and fuel pump support unit to be combined through a single access opening cover located in the top center of the fuel tank. The combined assembly could be made more compact and easier to insert through the access opening if the fuel pump were mounted vertically rather than horizontally.

My invention comprises means for supporting a fuel pump near the bottom of a fuel tank directly below the access opening cover. The assembly of my invention supports the fuel pump firmly through any forseeable road vibrations or shocks but in such a way that the pump can be pushed out of its normal position if struck from below by the tank bottom.

In my assembly, the pump is retained in a bracket by a vibration damping resilient member; and the pump outlet is connected to a rigid fuel conduit through a similarly vibration damping flexible conduit. This reduces the transmission of pump vibration to the fuel tank structure and thus helps reduce the pump operating noise.

My assembly includes a bracket with vertical arms which provide a convenient structure for the attachment of a gauge sender and float unit as well as supporting a seat for reception of the pump.

Further details and advantages of my invention will be apparent from the accompanying drawings and following description of the preferred embodiment.

SUMMARY OF THE DRAWINGS

FIG. 3 is a view along line 3—3 in FIG. 1.

FIG. 4 is a view of a portion of my invention as shown in FIG. 1 with the pump pushed out of its seat from below.

DESCRIPTION OF THE PREFERRED EMBODIMENT

Figure 1:
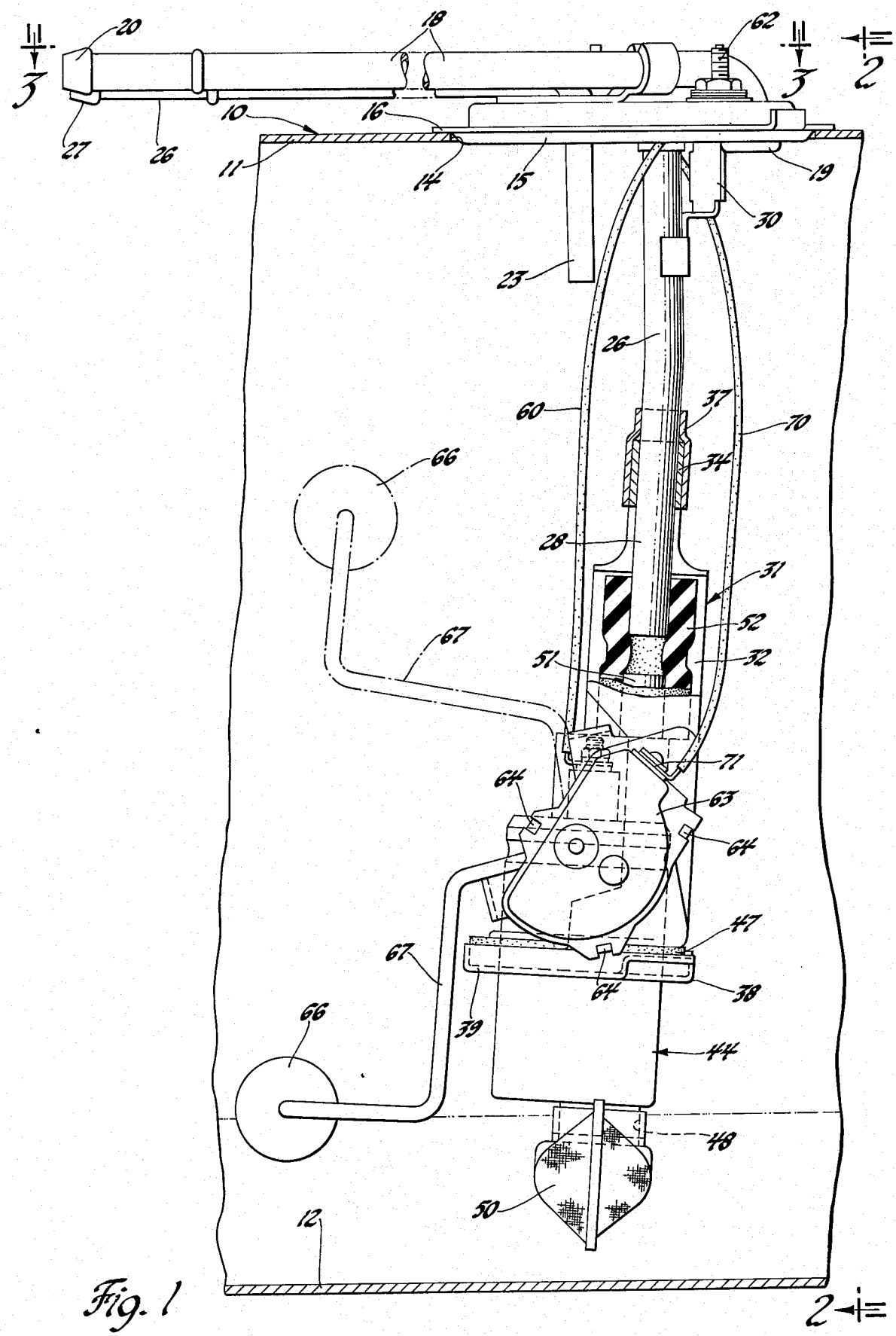
FIG. 1 is a partially cutaway view of my invention in its environment.
Figure 2:
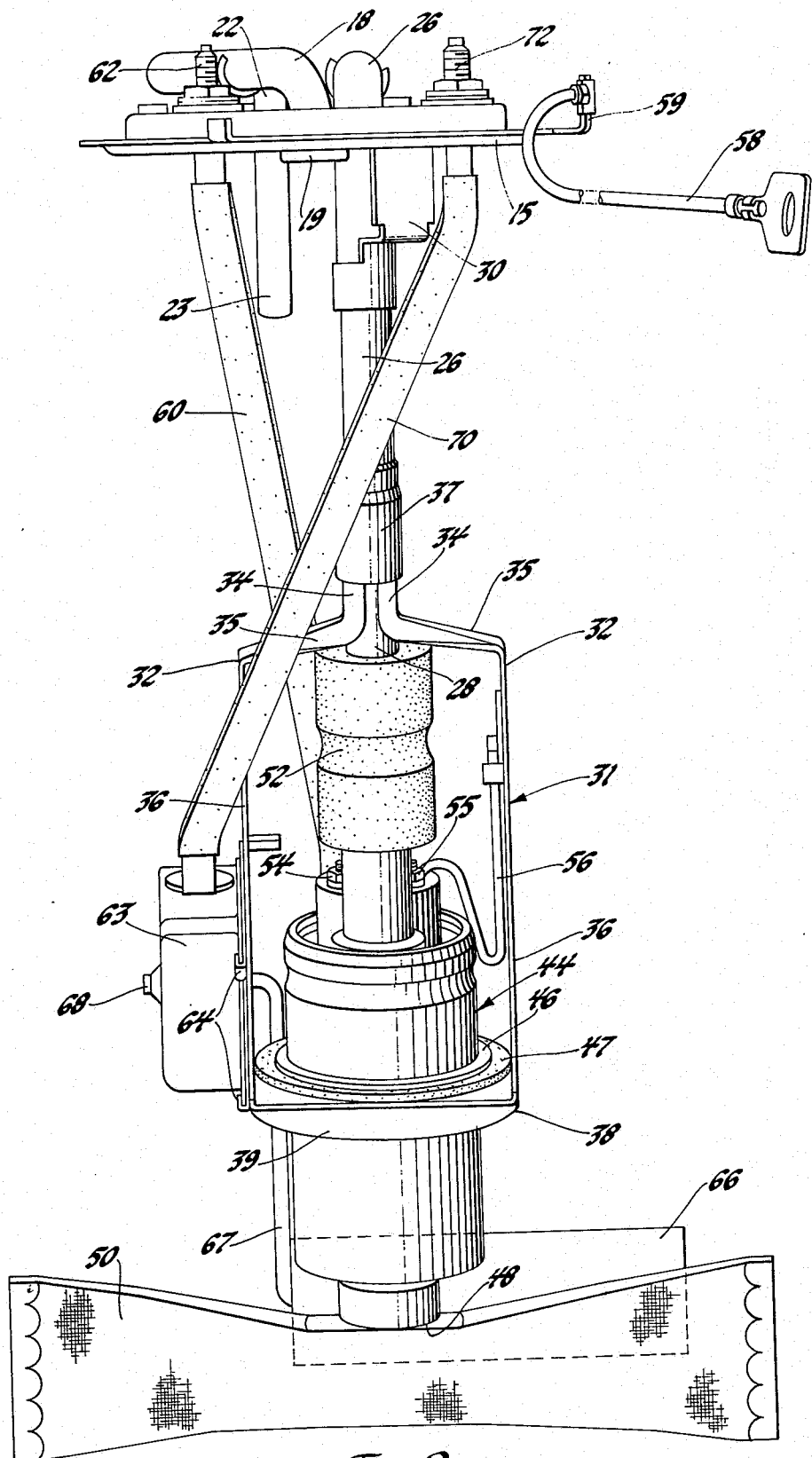
FIG. 2 is a view along line 2—2 in FIG. 1.

FIG. 1 shows a portion of a fuel tank 10, which holds fuel for an engine, not shown. Fuel tank 10 has a top wall 11 and a bottom wall 12; and the top wall 11 is provided with an access opening 14, which is ideally although not necessarily, located in the geometrical center of top wall 11.

An access opening cover 15 is of a size and shape to close access opening 14 and is provided with a peripheral rim 16 which can be sealingly fixed to the top wall 11 by welding or other means.

A number of metal tubes are fixed to, and project through, cover 15. A vapor outlet tube 18 opens to the underside of cover 15 into a chamber formed by a splash cup 19 and open to the tank 10, cup 19 helping to prevent liquid fuel from splashing up into the tube 18. Tube 18 has an end 20 outside the tank adapted to receive the end of a flexible conduit, not shown, which leads to a fuel vapor storage and disposal system.

A vapor return tube 22 has an end 23 within tank 10 and another end 24 outside tank 10. End 24 of tube 22 is adapted to receive a flexible conduit, not shown, leading from a fuel-vapor separator in the fuel supply line.

A fuel supply tube 26 has an end 27 outside tank 10, to which end is attached a fuel supply line. Tube 26 projects through cover 15 and extends downward to an end 28 well within tank 10. A brace 30, fixed to the underside of cover 15 and tube 26, helps maintain tube 26 rigid with respect to cover 15.

A bracket 31 is attached to fuel supply tube 26 near its lower end 28. In this embodiment, bracket 31 has a pair of arms 32 each arm 32 having an upper portion 34, a middle portion 35 and a lower portion 36.

Each upper portion 34 is rounded to fit against the outside surface of tube 26. The upper portions 34 are held against tube 26 diametrically opposite each other by a tubular sleeve 37 which surrounds the tube 26 and upper portions 34 and is swaged securely to cause upper portions 34 to engage the outer walls of the fuel tube 26.

Middle portions 35 of bracket 31 extend radially outward in opposite directions from the lower ends of upper portions 34; and the lower portions 36 extend downward parallel to each other and to tube 26 from the outer ends of middle portions 35 to a level well below lower end 28 of tube 26.

A generally horizontal circular mounting seat 38 is supported at the lower ends of lower portions 36. Seat 38 comprises an axial annular portion 39 attached to arms 31 and a radial annular portion 40 extending radially inward from the lower edge of the axial annular portion 39. The inner edge of radial annular portion 40 defines a circular opening 42 slightly larger than the cylindrical outer casing 43 of a fuel pump 44 of the type shown in U.S. Patent No. 3,418,991 to Shultz et al., which projects downward through it. Fuel pump 44 has formed, approximately at its axial center of mass around the casing 43, a flange 46 with an outer diameter greater than that of opening 42 but less than that of axial annular portion 39. Pump 44 projects downward through opening 42 with flange 46 above seat 38. In the annular space defined axially by radial annular portion 40 and flange 46 and radially by axial annular portion 39 and casing 43, lies a resilient annular member 47, which can be made of any resilient plastic material not adversely affected by gasoline or gasoline additives. Annular member 47 has inner and outer diameters such that it fits rather tightly between axial annular portion 39 and casing 43, so as to hold pump 44 securely within seat 38, pump 44 having been pushed downward during assembly of the combination so that the flange 46 presses annular member 47 firmly against radial annular portion 40.

In this position, a pump inlet tube 48 and attached filter 50 are suspended adjacent the bottom wall 12 of tank 10; while a pump outlet tube 51 projects upward toward the lower end 28 of fuel supply tube 26. A section of flexible conduit 52 connects pump outlet tube 51 with lower end 28 of fuel supply tube 26.

Pump 44 contacts rigid members of the fuel pump support assembly only through resilient annular member 47 and flexible conduit 52. Thus, by judicious choice of material and design of these latter two members, a low transmission of vibration and noise from the pump 44 to the fuel tank 10 can be accomplished.

Pump 44, in this embodiment, is powered by an electric motor contained therein, the motor having outide connections in a power terminal 54 and a ground terminal 55. Ground terminal 55 is connected through a wire 56 to one arm 32 of bracket 31. Arm 32, tube 26 and cover 15 form an electrically conductive ground path, and another wire 58, outside tank 10, connects a tab 59 of cover 15 to a ground point in the electrical supply system. Power terminal 54 of pump 44 is connected by a conductive metal strap 60 to a motor terminal 62 in cover 15. Strap 60 is covered with insulation over most of its length to prevent its shorting out aginst a portion of the assembly and ground potential. Motor terminal 62 can be connected outside the tank 10 to an appropriate electric potential to operate pump 44.

The arm 32 which does not have wire 56 attached thereto supports a gauge sender and float assembly, the gauge sender portion 63 of which is clamped to arm 32 by a number of metal fingers 64. A float 66 is attached to one end of an arm 67, the other end of which forms a pivot shaft 68 which projects into gauge center portion 63 to change the resistance of a variable resistor therein with float level in the standard manner. A ground connection for the gauge sender portion 63 is obtained through bracket 31; while an insulated metal strap 70 connects the power terminal 71 of gauge sender portion 63 with a gauge terminal 72 in cover 15, to which an appropriate voltage can be applied from the electrical source. The gauge sender portion 63 itself could be attached to lower portion 36 of arm 32 at a different height from that shown in the FIGURES if a different size and shape of fuel tank 10 required a different calibration.

In normal operation, fuel pump 44 takes in fuel through the filter 50 and inlet 48 near bottom wall 12 of fuel tank 10 and delivers it under pressure through outlet tube 51, flexible conduit 52 and fuel supply tube 26 to the rest of the fuel system. Vapor is evacuated through splash cup 19 and vapor outlet tube 18 to appropriate vapor disposal means; whereas vapor separated from the delivered fuel downstream can be returned to the tank 10 through vapor return tube 22. Appropriate electrical connections are made to terminals 62 and 72 for fuel pump 44 and gauge sender units 63. Resilient annular member 47 and flexible conduit 52 reduce the pump noise transmitted to the tank 10 while they hold the pump 44 in place.

In case of an accidental upward buckling of bottom wall 12 of fuel tank 10, the contact of wall 12 with pump 44 causes pump 44, possibly along with annular resilient member 47, to be pushed upward out of seat 38 as shown in FIG. 4. Flexible conduit 52 allows sideways movement of pump outlet tube 51, which tube 51 can pull completely out of flexible conduit 52 if the movement is greater than that shown in FIG. 4. Thus the vertical assembly does not, in an accident, puncture bottom wall 12 of the tank or push cover 15 away from top wall 11 of the tank; and tank 10 is not thereby caused to leak.

The above described embodiment is for purposes of disclosure and illustration only. Equivalent embodiments will naturally occur to those skilled in the art; and my invention should be therefore limited only by the claims which follow.

I claim

1. A fuel pump assembly for mounting in a fuel tank with an access opening through its top wall, the fuel pump assembly comprising, in combination:

an access opening cover adapted to close the access opening; a rigid conduit fixed to and projecting downward through the access opening cover into the tank; a bracket fixed to the rigid conduit within the tank, the bracket supporting a generally horizontal seat below the lower end of the rigid conduit; a resilient member in the seat; an axial flow fuel pump retained in the seat in a vertical attitude by the resilient member, the fuel pump having an inlet at its lower end near the bottom of the tank and an outlet at its upper end; a flexible conduit connecting the pump outlet with the lower end of the rigid conduit; the pump further having means about its periphery to engage the resilient member so as to prevent downward movement of the pump through the seat but allow upward movement of the pump out of the seat upon the application of a large upward or horizontal force to the pump.

2. The fuel pump assembly of claim 1 including a vapor outlet formed through the access opening cover.

3. A fuel pump assembly for use in a fuel tank having an access opening in its upper wall, the assembly comprising, in combination; an access opening cover effective to close the access opening; a rigid conduit fixed to and projecting through the access opening cover; a bracket having two or more arms with upper ends fixed to the rigid conduit and lower ends extending below the lower end of the rigid conduit, the bracket further having a generally horizontal circular seat fixed to the lower ends of the arms; an annular resilient member in the seat; an axial flow fuel pump supported in the seat by the resilient member, the fuel pump having an inlet at one axial end thereof adjacent the bottom of the tank and an outlet at the other axial end thereof adjacent the lower end of the rigid conduit, the fuel pump further including an annular flange therearound engaging the top of the annular resilient member to prevent pump from falling through the seat but allow the pump to be moved upward out of the seat when subjected to a force from below; and a flexible conduit connecting the pump outlet to the lower end of the rigid conduit.

4. The fuel pump assembly of claim 3 including a gauge sender and float assembly having a gauge sender portion attached to one of the bracket arms.

5. A fuel pump support unit for use with a tank having an access opening in its top wall, an axial flow fuel pump having a generally cylindrical body with an inlet and outlet at opposite axial ends thereof and an annular resilient member, the support unit comprising, in combination: an access opening cover adapted to close the access opening and having a vapor outlet opening therethrough: a splash cup with an opening therethrough covering the vapor outlet on the lower side of the access opening cover; a rigid conduit fixed to and projecting through the access opening cover; a bracket including a plurality of arms with upper ends attached to the rigid conduit and lower ends extending below the lower end of the rigid conduit, the bracket further including a generally horizontal circular seat fixed to the lower ends of the arms, the seat comprising an axial annular portion with a generally vertical axis and a radial annular portion extending radially inward from the lower edge of the axial annular portion, the seat thus being adapted to receive the annular resilient member and fuel pump with the pump being supported by the annular resilient member with its inlet near the tank bottom and the annular resilient member being supported in the seat, the lower end of the rigid conduit being connectible to the pump outlet.

\* \* \* \* \*